2 Sheets—Sheet 1.
H. D. EDDY & J. M. KASSON.
Sod-Cutter.
No. 209,804. Patented Nov. 12, 1878.
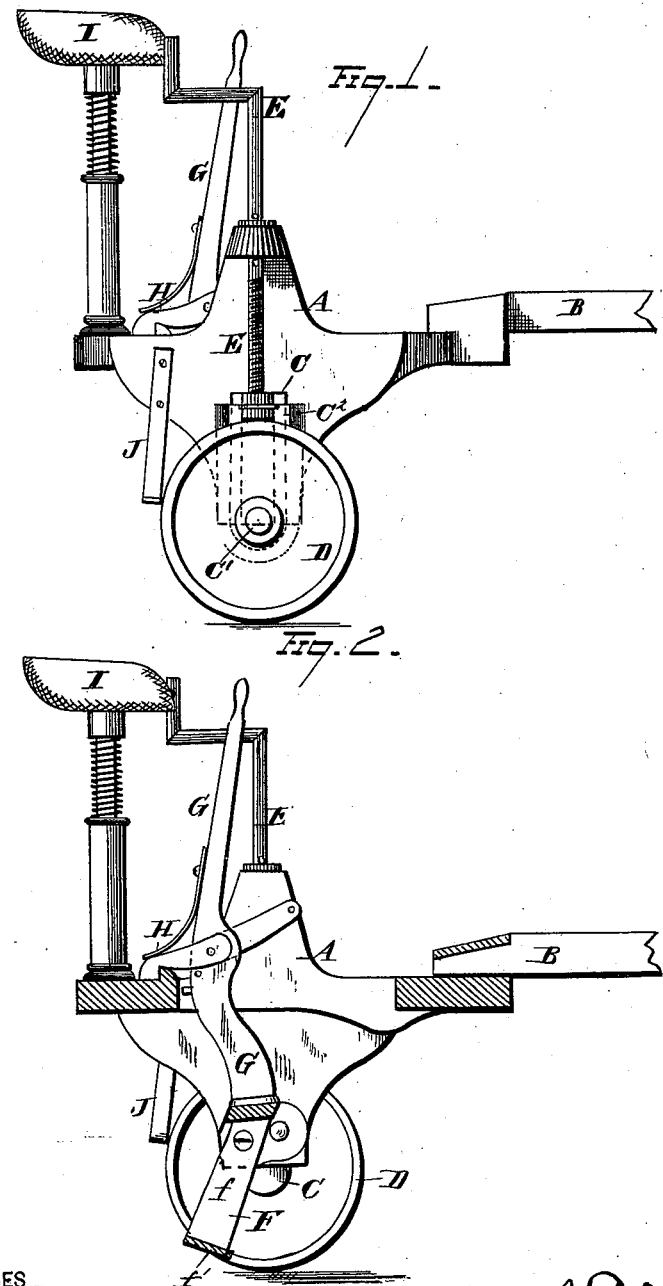

2 Sheets—Sheet 2.
H. D. EDDY & J. M. KASSON.
Sod-Cutter.
No. 209,804. Patented Nov. 12, 1878.
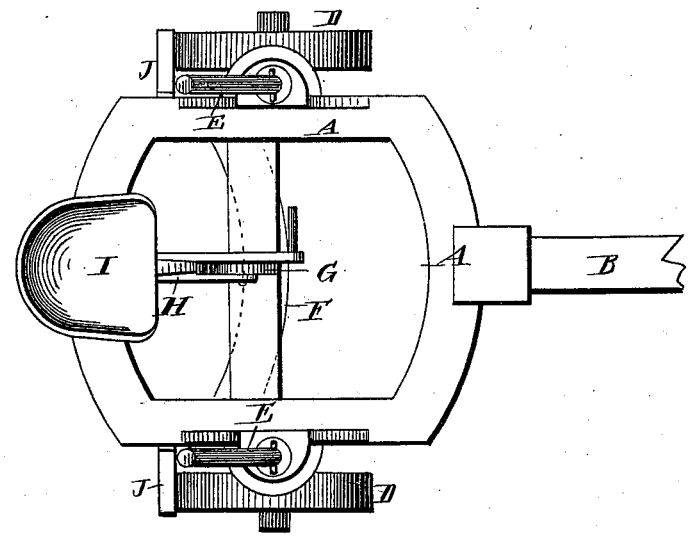
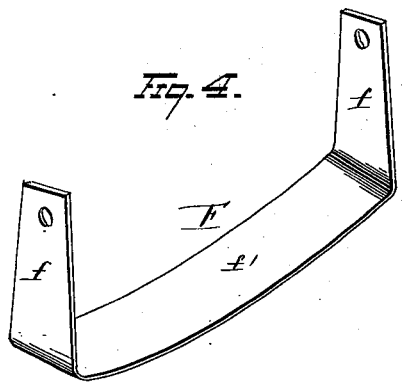
WITNESSES
E. J. Nottingham
A. W. Bright
INVENTORS
H. D. Eddy
and
J. M. Kasson
By Leggett and Leggett
ATTORNEYS

UNITED STATES PATENT OFFICE.

HORACE D. EDDY AND JOSEPH M. KASSON, OF GLENVILLE, OHIO.

IMPROVEMENT IN SOD-CUTTERS.

Specification forming part of Letters Patent No. 209,804, dated November 12, 1878; application filed September 20, 1878.

*To all whom it may concern:*

Be it known that we, HORACE D. EDDY and JOSEPH M. KASSON, of Glenville, in the county of Cuyahoga and State of Ohio, have invented certain new and useful Improvements in Sod-Cutters; and we do hereby declare the following to be a full, clear, and exact description of the invention, such as will enable others skilled in the art to which it pertains to make and use it, reference being had to the accompanying drawings, which form part of this specification.

Our invention relates to sod-cutters; and consists of the parts and combination of parts hereinafter described and claimed.

In the drawings, Figure 1 is a side elevation of a machine embodying the features of our invention. Fig. 2 is a longitudinal central section, showing parts in elevation. Fig. 3 is a plan view, and Fig. 4 is a separate view of the knife.

A is a suitable frame-work, to which the tongue B is attached. C are brackets, to the spindles C¹ of which the wheels D are attached. The brackets C are housed loosely, and are free to slide within guides C² on the frame A, in order that the wheels may be readily adjusted up or down. To effect this adjustment a block-and-screw attachment, E, is provided, connecting the frame A with the top of the bracket-post C. The upper end of the screw is shaped into a handle adjacent to the seat. Thus, to adjust the wheel D to a higher or lower level, it is only necessary to seize and turn the handle in the proper direction. The primary object of adjusting the wheels is, that one may travel in the furrow where the sod has been removed, while the other may travel upon the uncut sod, and the knife travel upon a level.

F is the knife. It is formed of two vertical end portions, *f*, and a horizontal central portion, *f'*. The end portions serve to separate the sod from that adjacent to it, while the part *f'* strips the sod from the ground. The knife is pivoted at its ends to the frame A, and is rigidly connected with a lever, G, whereby it may be raised from the ground around its pivots, or, when lowered to its work, be held securely while cutting. H is a clamp, preferably a gravity or spring catch or latch, for engaging with the frame A to hold the knife to its work. I is a seat for the driver. J are scrapers or guards, attached to the frame contiguous to the wheels, in order to keep the wheels clear of mud or dirt, which might otherwise impair the depth of cut of the knife. The knife, as shown, is preferably made to project forward at the center, so as to give a shearing cut in stripping the sod, and the upright edges of the knife are preferably inclined downward and backward slightly, for a like purpose.

The operation of the device is apparent. The driver presses down the lever G, so as to raise the knife from the ground. He then proceeds to the locality where the sod is to be cut. Then, adjusting the wheels to a common level, he draws up the lever G, forcing the knife into the ground, and secures it there by the catch H on the lever. After passing across the plot of ground he may remove the sod and return, after first turning the proper screw, E, sufficiently so that one wheel may ride in the furrow and the other upon the sod, and keep the knife at its former level.

We do not limit ourselves to any particular mechanism for raising and lowering the wheels, for this feature is not a part of our invention, and it is apparent that there are many ways of effecting this adjustment; but the one shown is simple and substantial.

The knife is located directly beneath the axles of the wheels, so that should there be irregularities in the surface of the sod, causing the wheels to raise or drop, the knife will rise or fall to conform to the same irregularity; whereas if the knife were located either in front of or behind the axle at any considerable distance, the wheels might drop into a low spot while the knife was traveling beneath a level surface, thus causing the knife to drop and cut a thick sod, while if the wheels should again rise and travel upon a higher piece of sod, the knife might subsequently come to the low spot, and as a result the knife might cut right out to the surface; but when the knife is directly beneath the axles the knife will follow the irregularities at the same time and place with the wheels, and consequently cut a sod of uniform thickness from an irregular surface of sod.

The upright edges of the knife may be slightly inclined inward or outward at the bottom, so as to give a bevel cut to the edges of the sod, thus enabling them to be more evenly matched in laying. So, also, the ends of the knife may be made to extend outward to the outer edges of the machine, in which form the knife may be adjusted to cut just below the surface, and thus serve as a weeder for roads.

What we claim is—

1. In a sod-cutter, the combination, with a truck-frame having its two wheels adapted to be maintained in independent vertical adjustment, of a sod-cutting knife formed as described, and located in approximate vertical plane below the axial line of the wheels, together with a lever which is operated to raise and lower said knife, substantially as set forth.

2. In a sod-cutter, the combination, with a truck-frame whose two sides are capable of being maintained in independent vertical adjustment, and a knife formed as described, of a lever connecting with the latter and provided with a spring-pressed catch, which is adapted to engage with a catch-fastening formed on the frame, and thereby hold said knife raised from operative position, substantially as set forth.

In testimony whereof we have signed our names to this specification in the presence of two subscribing witnesses.

HORACE D. EDDY.
JOSEPH M. KASSON.

Witnesses:
  JNO. CROWELL, Jr.,
  THOS. B. HALL.